(12) United States Patent
Bergström et al.

(10) Patent No.: US 12,162,087 B2
(45) Date of Patent: Dec. 10, 2024

(54) METHOD FOR CONTROLLING A SPOT WELDING ARRANGEMENT

(71) Applicant: Car-O-Liner Group AB, Västra Frölunda (SE)

(72) Inventors: Anders Bergström, Västra Frölunda (SE); Sonny Olerius, Västra Frölunda (SE); Mats Appelquist, Torslanda (SE)

(73) Assignee: Car-O-Liner Group AB, Västra Frölunda (SE)

(*) Notice: Subject to any disclaimer, the term of this patent is extended or adjusted under 35 U.S.C. 154(b) by 947 days.

(21) Appl. No.: 17/255,601

(22) PCT Filed: Jun. 10, 2019

(86) PCT No.: PCT/SE2019/050540
§ 371 (c)(1),
(2) Date: Dec. 23, 2020

(87) PCT Pub. No.: WO2020/009636
PCT Pub. Date: Jan. 9, 2020

(65) Prior Publication Data
US 2021/0260686 A1     Aug. 26, 2021

(30) Foreign Application Priority Data
Jul. 4, 2018   (SE) .................................. 1850845-7

(51) Int. Cl.
*B23K 11/25*      (2006.01)
*B23K 11/11*      (2006.01)
(Continued)

(52) U.S. Cl.
CPC ........... *B23K 11/253* (2013.01); *B23K 11/115* (2013.01); *B23K 11/28* (2013.01); *B23K 11/315* (2013.01)

(58) Field of Classification Search
CPC ..... B23K 11/253; B23K 11/115; B23K 11/28; B23K 11/315; B23K 11/255; B23K 11/34
See application file for complete search history.

(56) References Cited

U.S. PATENT DOCUMENTS 5,357,076 A * 10/1994 Blankenship ............ H05H 1/36
                                                              219/121.54
6,072,146 A *  6/2000 Matuschek .......... B23K 11/314
                                                              219/110
(Continued)

FOREIGN PATENT DOCUMENTS

| DE | 4432573 A1 | 4/1995 |
|---|---|---|
| DE | 202010005418 U1 | 9/2010 |
| WO | 2016096469 A1 | 6/2016 |

OTHER PUBLICATIONS

International Search Report and Written Opinion for International Application No. PCT/SE2019/050540 mailed Jun. 18, 2019, 10 pages.

*Primary Examiner* — Brian W Jennison
*Assistant Examiner* — Kristina J Babinski
(74) *Attorney, Agent, or Firm* — RMCK Law Group, PLC

(57) ABSTRACT

The present disclosure relates to a method for controlling a spot welding arrangement, the method comprising the steps of moving a welding tip portion of the spot welding arrangement between a first and a second position by applying a force to the welding tip portion; determining a distance moved between the first and second positions; determining a type of welding yoke connected to the spot welding arrangement based on the determined distance and the applied force; and controlling settings of the spot welding arrangement based on the welding yoke connected to the spot welding arrangement.

12 Claims, 3 Drawing Sheets

(51) Int. Cl.
    *B23K 11/28*        (2006.01)
    *B23K 11/31*        (2006.01)

(56) References Cited

U.S. PATENT DOCUMENTS

| | | | |
|---|---|---|---|
| 9,687,982 B1 * | 6/2017 | Jules | B25J 9/1612 |
| 2012/0197573 A1 | 8/2012 | Pecher | |
| 2014/0054272 A1 | 2/2014 | Kimoto | |
| 2014/0291300 A1 * | 10/2014 | Amagata | B23K 11/253 |
| | | | 219/90 |
| 2015/0177731 A1 | 6/2015 | Mader | |
| 2015/0336201 A1 | 11/2015 | Amagata | |
| 2018/0029155 A1 * | 2/2018 | Garza | G01L 25/003 |

* cited by examiner

Move a welding tip portion between a first and a second position — S1

Determine a distance moved between the first and second position — S2

Determine a type of welding yoke based on the distance and applied pressure — S3

Control settings of the spot welding arrangement based on the type of welding yoke connected — S4

METHOD FOR CONTROLLING A SPOT WELDING ARRANGEMENT

CROSS-REFERENCE TO RELATED APPLICATIONS

This application is a 371 U.S. National Stage of International Application No. PCT/SE2019/050540, filed Jun. 10, 2019, which claims priority to Swedish Patent Application No. 1850845-7 filed Jul. 4, 2018. The disclosures of each of the above applications are incorporated herein by reference in their entirety.

TECHNICAL FIELD

The present disclosure relates to a method for controlling a spot welding arrangement. The present disclosure also relates to a corresponding spot welding arrangement.

BACKGROUND

In the field of welding, spot welding arrangements, also referred to as welding guns, are commonly used. The spot welding arrangement may be portable and comprise a handle for holding the spot welding arrangement during operation thereof. Moreover, the spot welding arrangement preferably comprises a housing containing various electronical and mechanical components. A movable welding electrode is arranged from the housing and movable in relation to the housing. The welding electrode comprises a tip portion, also known as a welding cap, at an outer end thereof. The spot welding arrangement further comprises a stationary welding electrode also comprising a tip portion. A movable welding electrode is also conceivable instead of the stationary welding electrode. During a welding operation, a material to be welded is positioned between the tip portions of the movable and stationary welding electrodes, whereby the tip portions move towards each other such as to expose the material to a pressure, where after electric current is supplied through the material via the welding electrodes.

In a conventional spot welding arrangement, the stationary welding electrode is connected to a welding yoke. The welding yoke is in turn disconnectable from the remaining part of the spot welding arrangement. Hereby, welding yokes with different characteristics can be used depending on the type of object being welded. Hence, depending on the size and/or shape of material that is going to be welded, the operator may chose a specific welding yokes that is suitable for the particular welding operation.

However, when starting a welding operation there may be a problem in determining which specific type of yoke that is presently connected to the spot welding arrangement, as the yokes may have different characteristics although being more or less visually similar. This may result in wrong welding parameter being set during the welding operation.

SUMMARY

It is therefore an object to provide a spot welding arrangement which at least partially overcomes the above deficiencies. This is achieved, according a first aspect, by a method for controlling a spot welding arrangement, the method comprising the steps of moving a welding tip portion of the spot welding arrangement between a first and a second position by applying a force to the welding tip portion; determining a distance moved between the first and second positions; determining a type of welding yoke connected to the spot welding arrangement based on the determined distance and the applied force; and controlling settings of the spot welding arrangement based on the welding yoke connected to the spot welding arrangement.

The wording "applying a force" should in the context of the present disclosure also include "applying a pressure" since a pressure and force are variables that are dependent on each other. The applied force may be a predetermined force, i.e. set in advance, or it may be a force that is registered while being applied. Thus, the applied force moves the welding tip portion from the first position to the second position, i.e.

a predetermined distance. The force may be applied e.g. pneumatically, or by an electronically controlled motor, etc. The amplitude of the force may e.g. be detected by a force detector, such as a force detecting sensor. The force may also be preset and controlled by means of a valve, such as a proportional valve. Hereby, the proportional valve controls the amplitude of the force by regulating the pneumatic pressure arranged to move the welding tip portion.

The welding tip portion may also be referred to as a welding cap. The welding tip portion is a replaceable part as it is worn out after extensive use. Further, the spot welding arrangement preferably comprises, in addition to the movable welding tip portion, a welding tip portion on the welding yoke. Thus, during welding, the material to be welded is positioned between the two welding tip portions.

The distance moved between the first and second positions should preferably involve a contact between the movable welding portion and a welding portion of the welding yoke. Thus, when moving the movable welding tip portion to the second position, at least an outer end part of the welding yoke, at which a welding portion is arranged, will be displaced to some extent.

The inventors of the present disclosure have realized that the detecting a distance moved by the welding tip portion, preferably a distance moved during contact with a portion of the welding yoke, the specific type of yoke presently connected to the spot welding arrangement can be determined by also being aware of the magnitude of the force that is applied. An advantage is thus that the specific type of welding yoke presently connected to the spot welding arrangement can be identified/determined, whereby welding settings can be controlled accordingly. Hereby, correct welding parameters will be used during the subsequent welding operation. The welding settings may, for example, relate to a restriction on the amplitude of the weld pulse, provide force compensation based on the specific welding yoke utilized, a restriction on the maximum thickness of the material to be welded, etc. The above method is thus preferably performed prior to performing a welding operation.

The above described method may also function as a quality control of the welding yoke. In detail, if the specific type of welding yoke can not be determined, this can be an indication that a component of the welding yoke is malfunctioning. The operator may thus receive an indication of malfunctioning welding yoke. Further analysis of the specific malfunctioning may thus be necessary.

According to an example embodiment, the determined type of welding yoke connected to the spot welding arrangement may be one of a plurality of predefined welding yokes.

The wording "predefined welding yokes" should be understood to mean a well defined number of welding yokes that are connectable to the specific type of spot welding arrangement.

Hereby, and as will be described below, the spot welding arrangement may comprise a control unit with a readable medium containing data relating to the plurality of predefined welding yokes. Hence, based on the applied force and corresponding distance moved by the welding tip portion, the control unit can compare the data with corresponding data for each of the plurality of predefined welding yokes in order to determine which welding yoke that is presently connected to the spot welding arrangement. The control unit may be updated on a regular basis with regards to new welding yokes. Thus, in case a welding yoke is not included in one of the predefined welding yoke, the control unit can be updated with data relating to the new welding yoke.

Moreover, the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the step of determining the type of welding yoke connected to the spot welding arrangement may comprise the steps of determining a stiffness value for the welding yoke based on the determined distance and the applied force; and comparing the stiffness value with a stiffness value for each of the plurality of predefined welding yokes.

The stiffness value may, for example, be the stiffness of the welding yoke in the direction of movement from the first position to the second position. Hereby, the stiffness value is a one dimensional entity. However, the stiffness value may be a two dimensional entity, or three dimensional entity. For example, the stiffness value for the welding yoke may be composed of a stiffness matrix having stiffness components in each geometric direction.

An advantage is that the stiffness value can easily be compared to corresponding stiffness values for the plurality of predefined welding yokes. Hence, determining the stiffness value may improve the step of determining which welding yoke that is presently connected to the spot welding arrangement. This will in turn further improve controlling of the welding parameter settings.

According to an example embodiment, the method may further comprise the step of determining the type of welding yoke connected to the spot welding arrangement based on the predefined welding yokes having a stiffness value within a predetermined range from the determined stiffness value of the welding yoke connected to the spot welding arrangement.

Hereby, a marginal of error is acceptable. Thus, the determined stiffness value does not have to be exactly equal to the stiffness value of one of the predefined welding yokes. If the stiffness value is outside the range for each of the predefined welding yokes, this may be an indication of a malfunctioning welding yoke as described above.

According to an example embodiment, the spot welding arrangement may comprise a control unit comprising welding yoke data for each of the plurality of predefined welding yokes.

Thus, the control unit can both be operable to determine which welding yoke that is presently connected to the spot welding arrangement, as well as to control the settings of the spot welding arrangement based on the presently used welding yoke.

The control unit may thus preferably contain welding parameter data for each of the plurality of predefined welding yokes. The control unit may preferably be the same control unit as described above.

According to an example embodiment, the first position may correspond to a position at which the welding tip portion is in contact with a portion of the welding yoke.

Hereby, it is assured that the applied force will generate a measurable displacement of the welding yoke.

According to an example embodiment, the method may be preceded by the step of moving the welding tip portion towards the portion of the welding yoke until the welding tip portion is in contact with the portion of the welding yoke.

According to an example embodiment, the method may further comprise the step of determining an initial contact force between the welding tip portion and the portion of the welding yoke when the welding tip portion is arranged in the first position.

Hereby, the movement from the first position to the second position will be made with full contact between the movable welding tip portion and the portion of the welding yoke. Thus, the distance between the first and second positions of the movable welding tip portion will be the same as a corresponding distance moved by the portion of the welding yoke.

Furthermore, by measuring once the initial contact between the movable welding tip and the portion of the welding yoke will reduce a geometric play between these parts which may contribute to a more reliable measurement. The initial contact force may, for example, be determined by registering a pressure increase when moving the welding tip portion towards the portion of the welding yoke.

According to an example embodiment, the applied force may be determined based on a difference between the initial contact force and a contact force between the welding tip portion and the portion of the welding yoke when the welding tip portion is arranged in the second position.

The contact force may be determined in various ways, such as by a sensor measuring an applied force or pressure, or be preset and controlled by means of e.g. a valve that adjusts the applied pressure to correspond to the preset force, etc. The force may be determined directly or by means of measuring another quantity which is dependent on the force, such as the pressure, strain, etc.

According to a second aspect, there is provided a spot welding arrangement comprising a movable welding tip portion and a welding yoke, wherein the welding tip portion and a portion of the welding yoke are arranged to perform a spot weld operation to a portion of material arranged there between, wherein the spot welding arrangement further comprises a control unit, the control unit being configured to determine a distance between a first and a second position of the movable welding tip portion when a force is applied to the movable welding tip portion; determine a type of welding yoke connected to the spot welding arrangement based on the determined distance and the applied force; and control settings of the spot welding arrangement based on the welding yoke connected to the spot welding arrangement.

According to an example embodiment, the spot welding arrangement may further comprise a force detecting device connected to the control unit, the force detecting device being arranged to detect a contact force between the movable welding tip portion and a portion of the welding yoke.

The force detecting device may e.g. be a force detection sensor or the like. The force detecting device may also be a pressure sensor, wherein the force is indirectly detected via the detected contact pressure. The force detecting device may also be arranged to detect a generated strain value, such as to indirectly detecting the contact force. Other types of force detecting devices are also conceivable.

According to an example embodiment, the spot welding arrangement may further comprise a distance detector connected to the control unit, the distance detector being arranged to detect the distance moved between the first and second positions.

The distance detector may, for example, be a distance sensor connected to the control unit and arranged to detect a distance moved by the movable welding tip portion. Other types of distance detectors are also conceivable.

Further effects and features of the second aspect are largely analogous to those described above in relation to the first aspect.

Further features of, and advantages with, the present disclosure will become apparent when studying the appended claims and the following description. The skilled person will realize that different features of the present disclosure may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION

Figure 1:
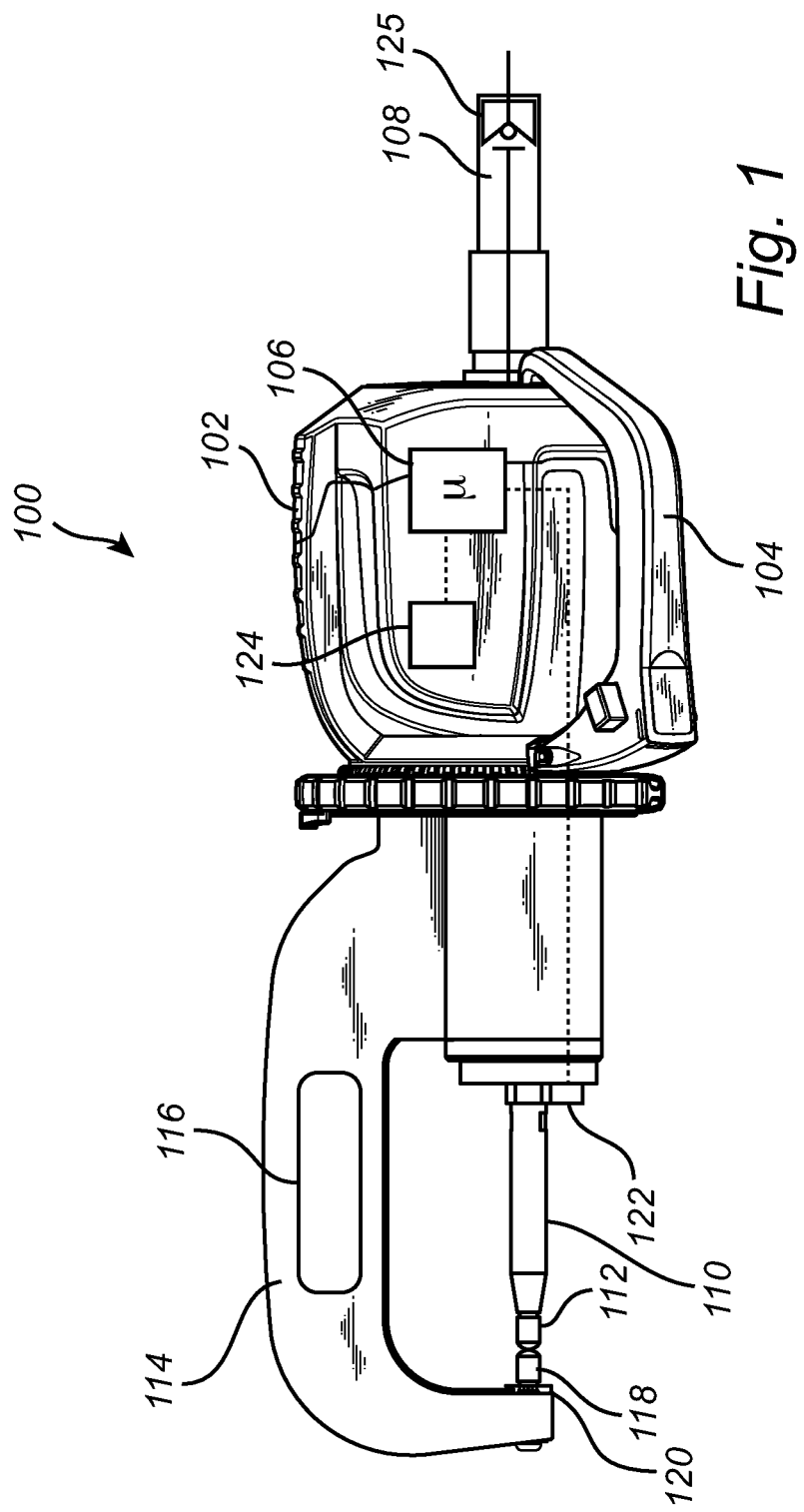
FIG. 1 is a schematic illustration of a spot welding arrangement according to an example embodiment.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, a schematic illustration of a spot welding arrangement 100 according to an example embodiment is depicted. The spot welding arrangement 100 comprises a housing portion 102 with a handle 104 for holding the spot welding arrangement 100 with one of the operator's hands. The housing portion 102 comprises electronics and mechanics (not shown) for operating the spot welding arrangement 100 during operation thereof. In particular, the housing portion 102 comprises a control unit 106 arranged to, for example, determine which type of welding yoke that is connected to the spot welding arrangement 100 and to control welding settings of the spot welding arrangement 100 before, and during operation thereof. The operations of the control unit 106 will be described further below. Moreover, a welding cable 108 is connected to the housing portion for supply of electricity to the spot welding arrangement 100.

Furthermore, the spot welding arrangement 100 comprises a welding electrode 110 extending from the housing portion 102. The welding electrode 110 is movable in its axial direction which will be described further below. Still further, the spot welding arrangement 100 comprises a welding tip portion 112 arranged at an outer end portion of the movable electrode 110. The welding tip portion 112 is also commonly referred to as a welding cap, or cap electrode. The welding tip portion 112 is a wear part which is replaceable after extensive use.

Moreover, the spot welding arrangement 100 comprises a welding yoke 114. The welding yoke 114 is in the example embodiment arranged in a C-shaped configuration and comprises a portion 118 arranged at an outer end part 120 of the welding yoke 114. The portion 118, i.e. a welding tip portion is also arranged as a welding cap and which is a replaceable wear part.

As is further depicted in FIG. 1, the spot welding arrangement 100 also comprises a distance detector 122 arranged to detect the distance moved by the movable welding tip portion 112. According to the example depicted in FIG. 1, the spot welding arrangement 100 may also comprises a force detector 124 for detecting a contact force between the movable welding tip portion 112 and the portion 118 of the welding yoke 114. However, other means for detecting the force, or setting the force are also conceivable. Moreover, the distance detector 122 and the force detector 124 are connected to the control unit 106 for transmitting control signals thereto. Further, the welding arrangement 100 may comprise a valve 125 arranged to control the supply of pneumatic pressure to the welding tip portion. Hereby, the valve 125, preferably a proportional valve, can control the supply of high pressurized air for setting a preset force value. The valve 125 may thus be used in addition or in combination with the force detector 124.

During welding of a material, the material, or materials to be welded are placed between the welding tip portion 112 and the portion 118 of the welding yoke 114. Due to the C-shaped configuration, the material is given sufficient space for the welding operation. The movable welding tip portion 112 moves towards the welding yoke 114 when the material is positioned between the welding tip portion 112 and the portion 118 of the welding yoke 114. Once a sufficient pressure is obtained between the welding tip portions, electrical current is supplied between the welding tip portions for achieving a spot weld in the material.

Furthermore, the welding yoke 114 is a disconnectable from the remaining part of the spot welding arrangement 100. Hereby, the operator can chose between different welding yokes before performing a welding operation. The welding yokes may e.g. be provided in different shapes and sizes. An advantage is that a welding yoke that is suitable for the particular material to be welded can be chosen. For example, a welding yoke having a larger C-shape can be chosen if the spot weld is to be made at a center portion of a relatively large material. Also, different welding yokes are preferably used depending on the type of material to be welded and/or the thickness of the material to be welded. Different welding settings should thus be controlled based on the specific type of welding yoke that is chosen. The settings may, for example, relate to a restriction on the amplitude of the weld pulse, provide force compensation based on the specific welding yoke utilized, a restriction on the maximum thickness of the material to be welded, welding pressure, duration of a welding event, applied welding current, etc.

It should be readily understood that the components arranged in connection to the welding arrangement are merely schematically depicted and must not necessarily be arranged on/in the specific welding yoke arrangement 100. For example, the control unit 106, the force detector 124 and the valve 125 may form part of a unit giving supply of electrical current to the welding arrangement 100. In such a case, control signals are generated in the external unit, which unit thus forms part of the above described welding arrangement 100.

Figure 2:
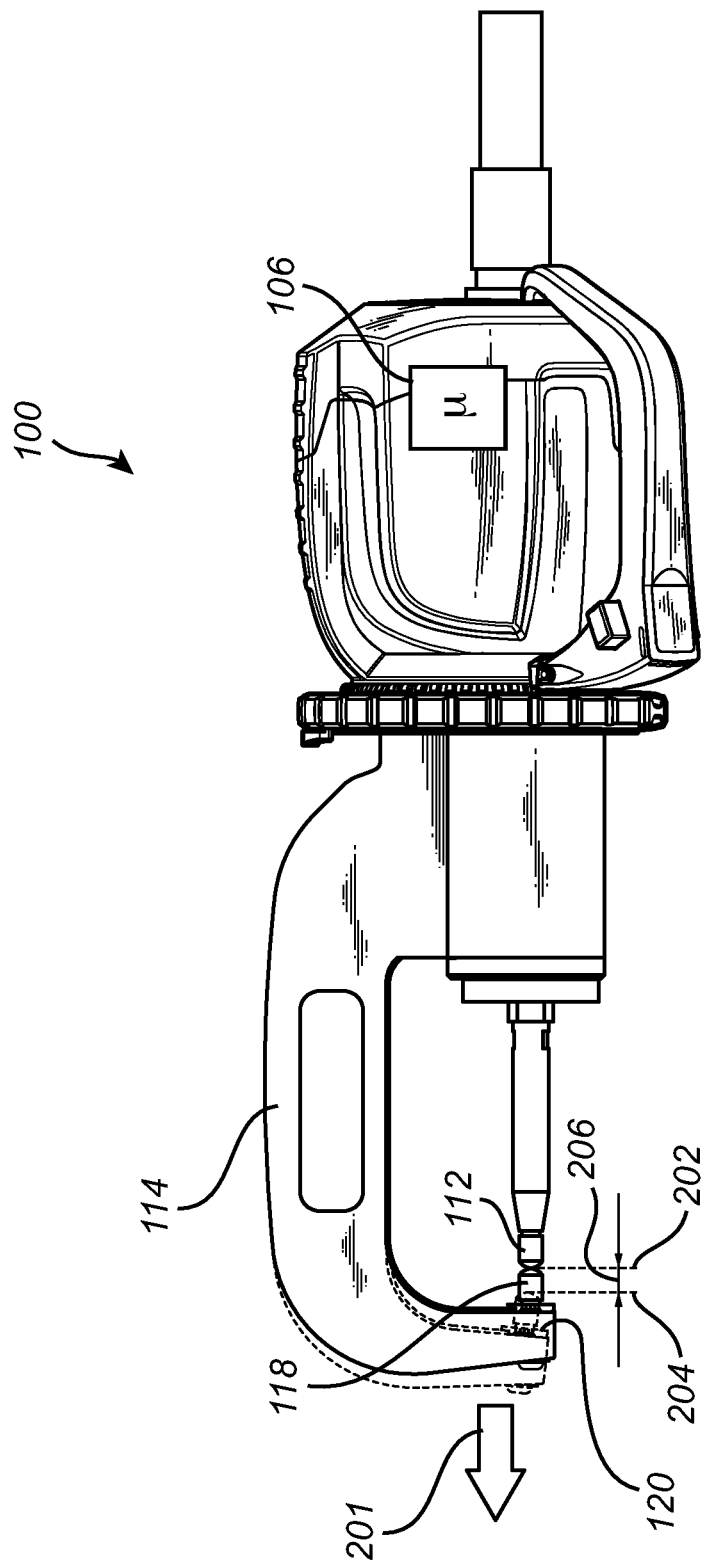
FIG. 2 is a schematic illustration of the spot welding arrangement in FIG. 1 when applying a contact force to the spot welding arrangement.
Figure 3:
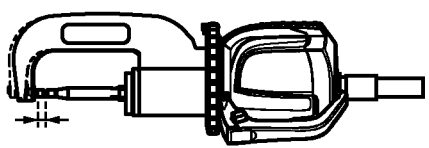
FIG. 3 is a flow chart illustrating a method for controlling a spot welding arrangement according to an example embodiment.
Figure 3:
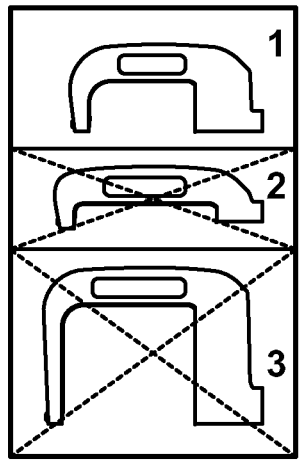
Figure 3:
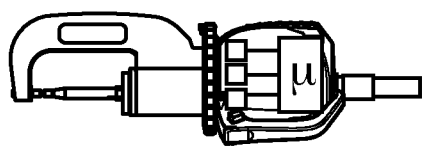

There may however be a problem in determining which specific type of welding yoke 114 that is presently connected to the spot welding arrangement 100. The following will describe an example embodiment of a method for determining which type of yoke that is connected to the spot welding arrangement 100, whereby welding parameters of the spot welding arrangement 100 is controlled based on which type of welding yoke that is used. Reference is therefore made to FIGS. 2 and 3.

When determining which type of welding yoke 114 that is connected to the spot welding arrangement 100, the movable welding tip portion 112 is moved towards the portion 118 of the welding yoke 114 until contact between the welding tip portion 112 and the portion 118 of the welding yoke 114 is detected. The contact can be detected by the control unit by use of e.g. the force detector 124, although other alternatives are conceivable, such as a pressure sensor, or other type of suitable sensor. Hereby, a starting position, in the following referred to as the first position 202 is determined. The welding tip portion 112 is thereafter moved S1 in its axial direction 201 from the first position 202 to a second position 204. Hereby, the welding tip portion 112 has moved a distance 206 between the first 202 and second 204 positions. As the welding tip portion 112 and the portion 118 of the welding yoke 114 were in initial contact at the first position 202, also the portion 118 of the welding yoke 114 and in turn the outer end part 120 of the welding yoke 114 have moved a distance 206 corresponding to the distance between the first 202 and second 204 positions. The welding yoke 114 is thus flexing when exposed to the applied force. The control unit 106 thus determines S2 the distance 206 moved between the first 202 and second 204 positions as well as the force for achieving the movement.

By means of the distance 206 moved between the first 202 and second 204 positions, as well as the corresponding force for achieving the movement, a stiffness value of the welding yoke 114 can be determined. The stiffness value can, for example, be composed of a stiffness matrix containing stiffness values in different geometrical directions, etc. The control unit 106 then compares the stiffness of the welding yoke 114 presently connected to the spot welding arrangement 100 with corresponding stiffness values, e.g. stiffness matrices, for a plurality of predefined welding yokes. Hence, stiffness data for the plurality of predefined welding yokes are provided in a readable memory of the control unit 106. The control unit 106 thus determines S3 which type of welding yoke 114 presently connected to the spot welding arrangement 100 based on the stiffness data for the plurality of predefined welding yokes that is most similar to the stiffness of the connected welding yoke. As can be seen in FIG. 3, the welding yoke indicated by numeral 1 is determined to correspond to the welding yoke 114 presently connected to the spot welding arrangement 100.

When the type of welding yoke 114 connected to spot welding arrangement 100 has been determined, the control unit 106 controls welding settings for the spot welding arrangement 100. The welding settings are specific for the type of welding yoke 114 connected to the spot welding arrangement 100. Hereby, the subsequent welding operation will be performed with e.g. a suitable welding pressure, applied welding current, compensation for welding yoke deformation, etc.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

It is to be understood that the present disclosure is not limited to the embodiment described above and illustrated in the drawings; rather, the skilled person will recognize that many changes and modifications may be made within the scope of the appended claims.

The invention claimed is:

1. A method for controlling a spot welding arrangement, the method comprising the steps of:
    moving a welding tip portion of the spot welding arrangement between a first and a second position by applying a force to the welding tip portion;
    determining a distance moved between the first and second positions;
    determining a type of welding yoke connected to the spot welding arrangement based on the determined distance and the applied force; and
    controlling settings of the spot welding arrangement based on the welding yoke connected to the spot welding arrangement.

2. The method according to claim 1, wherein the determined type of welding yoke connected to the spot welding arrangement is one of a plurality of predefined welding yokes.

3. The method according to claim 2, wherein the step of determining the type of welding yoke connected to the spot welding arrangement comprises the steps of:
    determining a stiffness value for the welding yoke based on the determined distance and the applied force; and
    comparing the stiffness value with a stiffness value for each of the plurality of predefined welding yokes.

4. The method according to claim 3, further comprising:
    determining the type of welding yoke connected to the spot welding arrangement based on the predefined welding yokes having a stiffness value within a predetermined range from the determined stiffness value of the welding yoke connected to the spot welding arrangement.

5. The method according to claim 2, wherein the spot welding arrangement comprises a control unit comprising welding yoke data for each of the plurality of predefined welding yokes.

6. The method according to claim 1, wherein the first position corresponds to a position at which the welding tip portion is in contact with a portion of the welding yoke.

7. The method according to claim 6, the method being preceded by the step of:
moving the welding tip portion towards the portion of the spot welding arrangement until the welding tip portion is in contact with the portion of the welding yoke.

8. The method according to claim 6, further comprising the step of:
determining an initial contact force between the welding tip portion and the portion of the welding yoke when the welding tip portion is arranged in the first position.

9. The method according to claim 8, wherein the applied force is determined based on a difference between the initial contact force and a contact force between the welding tip portion and the portion of the welding yoke when the welding tip portion is arranged in the second position.

10. A spot welding arrangement comprising a movable welding tip portion and a welding yoke, wherein the welding tip portion and a portion of the welding yoke are arranged to perform a spot weld operation to a portion of material arranged there between, wherein the spot welding arrangement further comprises a control unit, the control unit being configured to:

determine a distance between a first and a second position of the movable welding tip portion when a force is applied to the movable welding tip portion;

determine a type of welding yoke connected to the spot welding arrangement based on the determined distance and the applied force; and control settings of the spot welding arrangement based on the welding yoke connected to the spot welding arrangement.

11. The spot welding arrangement according to claim 10, further comprising a force detecting device connected to the control unit, the force detecting device being arranged to detect a contact force between the movable welding tip portion and a portion of the welding yoke.

12. The spot welding arrangement according to claim 10, further comprising a distance detector connected to the control unit, the distance detector being arranged to detect the distance moved between the first and second positions.

* * * * *